United States Patent
Vedula et al.

(10) Patent No.: US 8,164,866 B2
(45) Date of Patent: Apr. 24, 2012

(54) IDENTIFICATION AND PROTECTION OF AN AEROSPACE AC-DC POWER SYSTEM IN THE PRESENCE OF DC CONTENT DUE TO FAULTY LOADS

(75) Inventors: Sastry V. Vedula, Loves Park, IL (US); Mario R. Rinaldi, Waukesha, WI (US); Kenneth Whalen, Moorpark, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 539 days.

(21) Appl. No.: 12/388,297

(22) Filed: Feb. 18, 2009

(65) Prior Publication Data
US 2010/0208393 A1    Aug. 19, 2010

(51) Int. Cl.
H02H 7/06 (2006.01)
(52) U.S. Cl. .............................. 361/20; 361/18
(58) Field of Classification Search .................. None
See application file for complete search history.

(56) References Cited

U.S. PATENT DOCUMENTS

| | | | | |
|---|---|---|---|---|
| 3,644,783 | A * | 2/1972 | Snyder | 315/127 |
| 4,556,842 | A * | 12/1985 | Rosswurm | 324/102 |
| 4,905,117 | A * | 2/1990 | Beg | 361/93.6 |
| 5,247,205 | A * | 9/1993 | Mototani et al. | 307/66 |
| 6,583,994 | B2 * | 6/2003 | Clayton et al. | 363/21.18 |
| 2007/0007969 | A1 * | 1/2007 | Dai et al. | 324/601 |

FOREIGN PATENT DOCUMENTS
JP           11205996   *   7/1999

OTHER PUBLICATIONS

Bolduc, L., et al. Development of a DC Current-Blocking Device for Transformer Neutrals, IEE Transactions On Power Delivery, vol. 20, No. 1, pp. 163-167, Jan. 2005.

Picher, P., et al. Study of the Acceptable DC Current Limit in Core-Form Power Transformers, IEEE Transactions on Power Delivery, vol. 12, No. 1, pp. 257-265, Jan. 1997.

Srivastava, A., AC/DC Power System Modeling and Analysis for Shipboard Applications, pp. 1-5, 2007.

Santana, J, et al., Sensing Weak DC Components of Strong AC Currents in Railway Vehicles, I.S.T./I.N.J.C.,DEEC, Maquinas Electronicas Electronica de Potencias Av. Rovisco Pais 1096 Lisboa Codex, pp. 2561-2564, Portugal 1991.

Takasu, N., et al. An Experimental Analysis of DC Excitation of Transformers by Geomagnetically Induced Currents, IEE Transactions on Power Delivery, vol. 9, No. 2, pp. 1173-1182, Apr. 1994.

Wang, S., et al. Influence of HVDC Ground Electrode Current on AC Transmission System and Development of Restraining Device, DRPT2008, pp. 2151-2156, Nanjing China, Apr. 6-9, 2008.

* cited by examiner

*Primary Examiner* — Jared Fureman
*Assistant Examiner* — Terrence Willoughby
(74) *Attorney, Agent, or Firm* — Kinney & Lange, P.A.

(57) ABSTRACT

A fault protection system for an AC-DC distribution system detects the presence of DC content at individual loads, isolates the load responsible for the fault from the remainder of the distribution system, and blocks DC content from being propagated from the faulty load to the AC source. The fault protection system includes at least one circuit breaker connected to monitor the AC current provided to the individual electrical load and to detect the presence of DC content indicative of the load being faulty. In response to detected DC content, the circuit breaker trips open to disconnect the electrical load from the AC distribution system to prevent DC content from being propagated to adjacent loads.

16 Claims, 7 Drawing Sheets

IDENTIFICATION AND PROTECTION OF AN AEROSPACE AC-DC POWER SYSTEM IN THE PRESENCE OF DC CONTENT DUE TO FAULTY LOADS

BACKGROUND

The present invention relates to AC-DC power distribution systems, and in particular to power distribution systems that include DC content protection.

AC-DC power distribution systems are employed in a variety of applications to distribute power from an AC generator to a plurality of connected loads. For example, in aerospace applications a variable frequency AC generator distributes AC power to a plurality of loads (either AC or DC loads). In a typical system, a few centralized transformer based rectifier units (TRUs) are used to convert AC power to DC power for distribution to a plurality of DC loads. The TRUs remain isolated from one another and provide little if any DC content as a result of failures (e.g., diode failures).

There has been a trend in aerospace applications (as well as in other fields) for more electronic loads that individually rectify the AC power to a high-voltage DC level. Passive or active rectification, such as that provided by autotransformers, is susceptible to faults (e.g., diode faults, DC link faults, etc.) that place DC content onto the AC distribution system. Without the electrical isolation provided by TRUs employing a two-winding transformer, DC content generated as a result of a fault at one load is propagated to other loads connected to the AC distribution system. That is, because each of the plurality of loads is connected in common with the AC generator, the DC content provided by a faulty load can be communicated to other loads on the distribution system, resulting in the potential damage, overheating, or inefficiency of the loads. In addition, DC content may be propagated to the AC generator. Significant DC content (e.g., DC currents) on the stator coils of the generator may result in the generator becoming saturated, and ultimately lost (i.e., shut-down).

It would be beneficial to provide an AC-DC power distribution system that isolates faulty loads contributing DC content to the AC distribution system and prevents the DC content from tripping the AC generator or damaging other loads connected to the AC generator.

SUMMARY

An AC-DC power distribution system includes an alternating current (AC) generator, at least one electrical load, at least one circuit breaker, and a direct current (DC) current blocking (DCCB) module. AC power is distributed by the AC generator to a plurality of connected loads, at least one of which is an electrical load that converts AC power from the AC generator to DC power. A fault on this load generates DC content that can be propagated to adjacent loads. To prevent this, the system includes a circuit breaker connected to monitor the AC current provided to the electrical load and to detect within the monitored AC current the presence of DC content indicative of a faulty load. In response to detected DC content, the circuit breaker trips open to electrically isolate the faulty load from the AC distribution system to prevent DC content from being propagated onto adjacent loads.

DETAILED DESCRIPTION

The AC-DC power distribution system according to the present invention includes an AC generator that provides AC power, at least one AC-DC converter for converting AC power distributed by the AC generator to DC power for consumption by a DC load, and at least one circuit breaker connected between the AC distribution system and the AC-DC converter. Each circuit breaker monitors the AC waveform provided by the AC distribution system for the presence of undesirable DC content, typically a result of a fault on the AC-DC converter. In response to detected DC content by a particular circuit breaker, the circuit breaker 'trips' open to disconnect the load from the AC distribution system. In this way, DC content caused by the faulty load is prevented from being fed into other loads connected on the AC distribution system. In another embodiment of the present invention, the AC-DC power distribution system includes DC content blocking modules connected to the output of the AC generator. In response to detected DC content, the DC content blocking module is activated to prevent DC content from being propagated to the AC power source. In this way, the present invention provides for DC content detection, isolation of loads responsible for the DC content, and DC content protection for the generator source.

Figure 1:
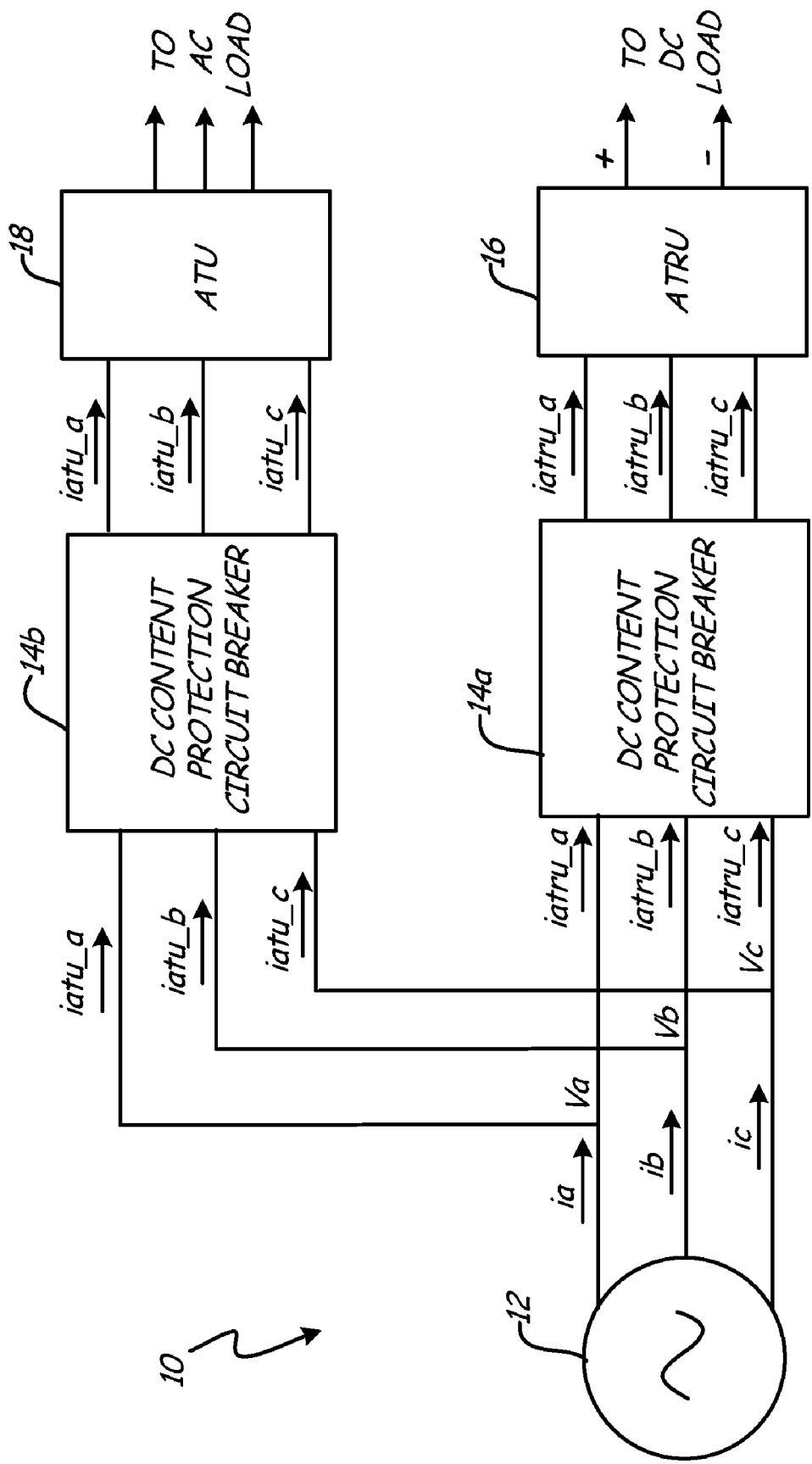
FIG. 1 is a block diagram of a variable frequency AC/DC power distribution system employing DC content protection circuit breakers according to an embodiment of the present invention.

FIG. 1 is a block diagram of variable frequency AC/DC power distribution system 10 employing direct current (DC) content protection circuit breakers according to an embodiment of the present invention. Power distribution system 10 includes alternating current (AC) generator 12, DC content protection circuit breakers 14a and 14b (hereinafter, "circuit breakers"), autotransformer/rectifier unit (ATRU) 16, and auto-transformer unit (ATU) 18.

The embodiment of power distribution system 10 shown in FIG. 1 is exemplary of a system employed in aerospace applications, in which AC power is distributed to a plurality of loads, at least some of which provide independent AC-DC power conversion for a respective load. AC generator 12 may be a variable frequency or constant frequency AC generator, providing three phase currents labeled ia, ib, and ic fed at voltages va, vb, and vc to a plurality of loads. ATRU 16 and ATU 18 receive AC power provided by AC generator 12 and convert the distributed AC/DC power for consumption (not shown). Component such as ATRU 16, which provides passive and/or active rectification, are susceptible to failure modes in which they provide DC content onto the AC distribution system. Additional components, such as bridge rectifiers or specific DC loads, may be employed either in addition to or in combination with ATRU 16. Generally, these components make up AC-DC converters used to convert AC power provided by the AC generator to feed various DC loads.

Figure 2:
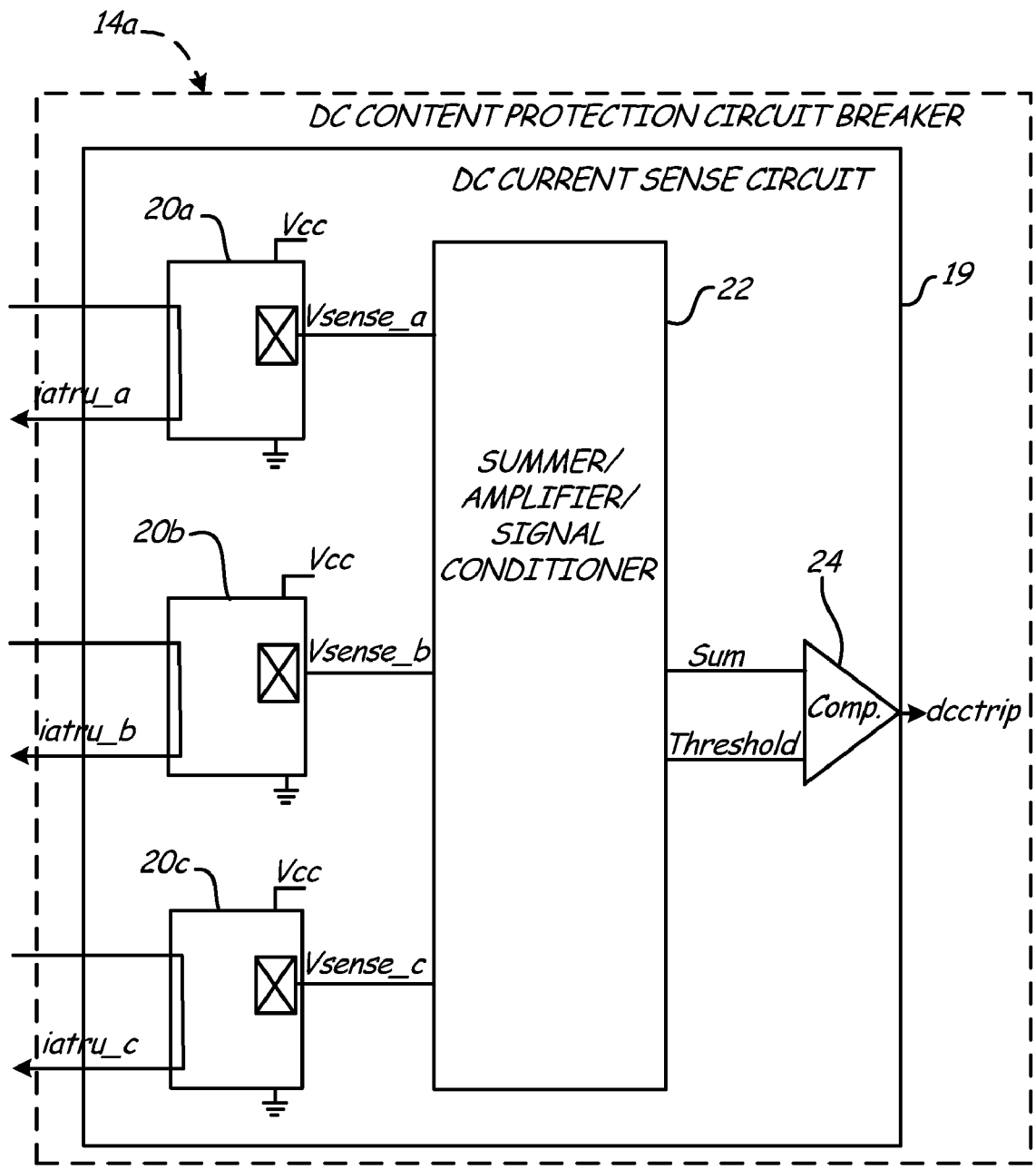
FIG. 2 is a circuit diagram illustrating DC current sensing in the ac lines feeding rectifier loads to be used for interruption of the circuit breaker according to an embodiment of the present invention.

Associated with each DC load are circuit breakers 14a and 14b, respectively. Circuit breakers 14a and 14b include DC current sense components (an embodiment of which is illustrated in FIG. 2) for monitoring the AC current drawn by ATRU 16 and ATU 18, respectively. In response to DC content detected by the current sense components, a contactor switch (not shown) is controlled to 'trip' open, thereby electrically disconnecting the faulty load from the AC distribution system. For example, circuit breaker 14a monitors the AC currents drawn by ATRU 16 (e.g., iatru_a, iatru_b, iatru_c) to detect the presence of DC content on the AC waveform. By detecting DC content at individual loads, circuit breakers 14a and 14b are able to isolate individual faulty loads from the rest of the system.

DC content is detected by monitoring the current drawn by each load. As such, circuit breakers 14a and 14b include sensors for monitoring the current provided to the respective loads. In the embodiment shown in FIG. 1, circuit breaker 14a monitors currents iatru_a, iatru_b and iatru_c and circuit breaker 14b monitors current iatu_a, iatu_b and iatu_c.

In response to detected DC content by one of the circuit breakers 14a or 14b, the circuit breaker that detected the fault 'trips' open to disconnect the faulty load from the AC distribution system. DC content generated by a faulty load is therefore prevented from being fed onto adjacent loads. For example, a fault in ATRU 16 resulting in the draw of DC content in the AC current provided to ATRU 16 trips circuit breaker 14a, isolating ATRU 16 from the AC distribution system and preventing DC content from being propagated to ATU 18.

FIG. 2 is a circuit diagram illustrating DC current sense circuit 19 employed by circuit breaker 14a to measure the current provided to ATRU 16 according to an embodiment of the present invention. DC current sense circuit 19 includes a plurality of Hall-effect sensors 20a, 20b and 20c, summer/amplifier/signal conditioner circuit 22 (hereinafter, 'summer circuit 22'), and comparator 24. Hall-effect sensors are based on the measurable voltage that results from current through a conductor resulting in a magnetic field. Assuming a constant magnetic field, the resulting voltage measured on the conductor is representative of the magnitude of the current flowing through the conductor. In the simplified circuit diagram shown in FIG. 2, a DC voltage Vcc is applied across two terminals (between Vcc and ground) to generate the constant magnetic field. The current to be measured is provided through a conductor (represented by the box labeled 'X'). A voltage proportional to the current is generated at the third terminal of each sensor, labeled here output voltages vsense_a, vsense_b, and vsense_c.

The proportional voltages generated by each Hall-effect sensor are relatively small. Summer circuit 22 amplifies the provided voltages to a usable magnitude and sums each to generate a summed output. In a three-phase system, the summed output of the measured currents is zero if no DC content is present. In the presence of DC content, the sum of the AC currents will be non-zero. The summed output is compared to a threshold value by comparator 24 to determine whether sufficient DC content has been detected such that circuit breaker 14a should trip open (e.g., the output signal 'dcctrip' initiates the circuit breaker trip). In another embodiment, rather than sum each of the measured currents, each phase is monitored individually over several cycles (e.g., ten cycles) to generate an average value of each monitored phase current. In the presence of DC content, the average value will be non-zero. Once again, the average value may be compared with a threshold value to determine whether DC content is sufficient enough to necessitate tripping the circuit breaker.

A benefit of the approach in which the sum of the AC currents is employed to detect the presence of DC content, as opposed to the embodiment in which AC currents are averaged over several cycles, is a reduction in time required to detect the presence of DC content. In this way, loads feeding DC content onto the AC distribution system are isolated more quickly, thereby reducing the DC content provided to adjacent loads and/or AC generator 12.

The embodiment described with respect to FIG. 2 represents a hardware approach to detecting the presence of DC content, in which analog voltages provided by each Hall-effect sensor are summed (by analog summer circuit 22) and compared to a threshold. In other embodiments, the output of each Hall-effect sensor may be a digital signal, and the summer/amplifier and comparator functions performed with analog circuitry are replaced with software implementations of these functions for detecting the presence of DC content within the monitored AC currents.

In other embodiments, instead of a Hall-effect sensor, other current sensors may be employed, such as giant, magneto-resistive (GMR) sensors to monitor and measure the current provided to each AC/DC converter (e.g., ATRU 16).

Figure 3:
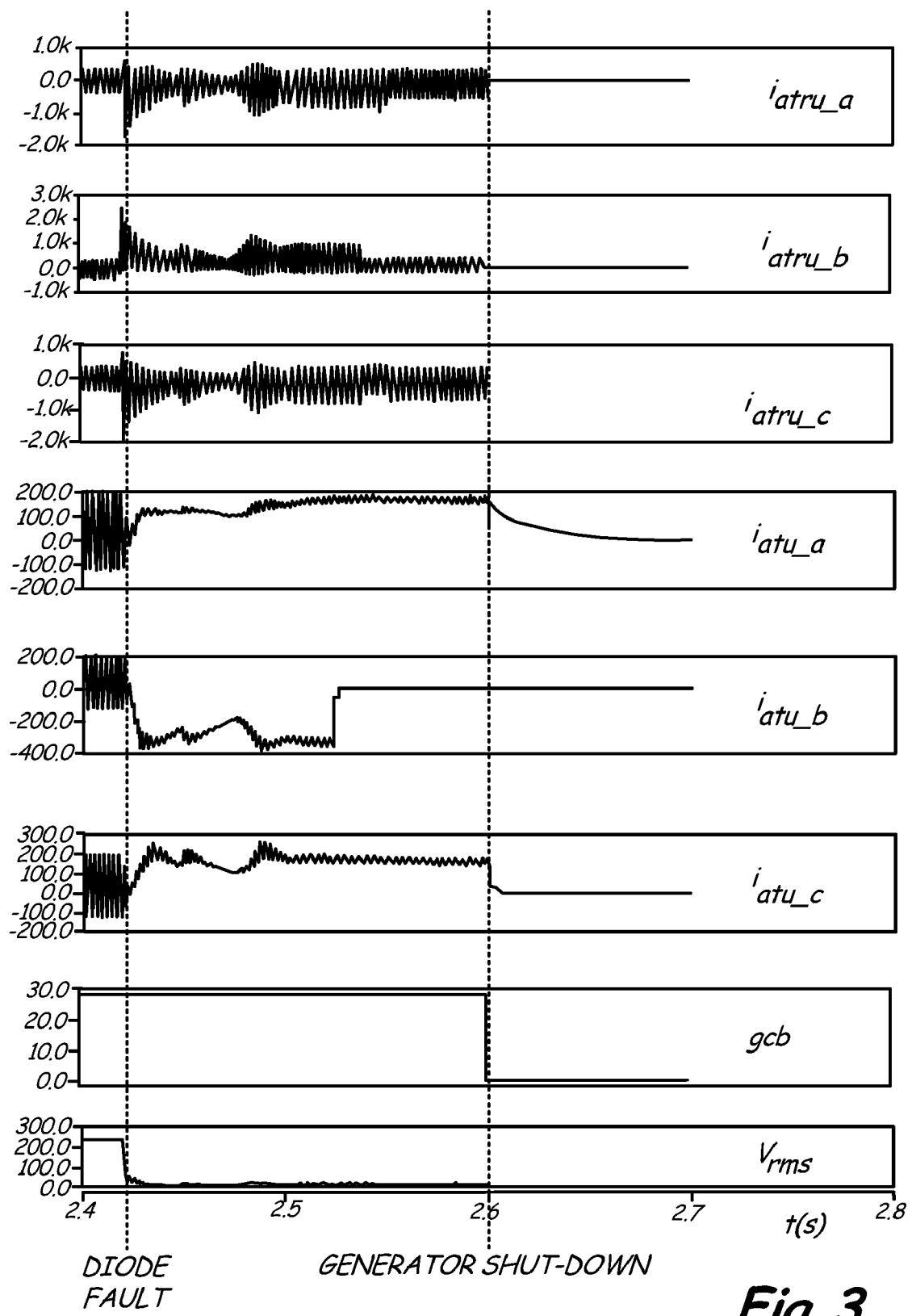
FIG. 3 shows a plurality of waveforms relating to the operation of the AC/DC power distribution system in the presence of DC content according to the prior art.

FIG. 3 shows a plurality of waveforms relating to the simulated operation of an AC/DC power distribution system as shown in FIG. 1, but without DC content protection (i.e., according to the prior art, wherein circuit breakers 14a and 14b do not respond to the presence of DC content). Furthermore, this simulation assumes prior art methods of minimizing the effects of DC content by operating AC generator 12 in a current-controlled mode with voltage fold-back. As a result, DC content protection is provided only at the output of the AC generator, with no detection or protection provided at the individual loads. In a current-controlled mode, AC generator 12 will 'fold-back' or decrease the voltage at the point of regulation (e.g., output voltages va, vb, and vc in this embodiment) in an effort to decrease the DC current flowing out of AC generator 12.

The waveforms are labeled to correspond with the labels provided with respect to FIG. 1, although these waveforms represent the operation of the power distribution system if no DC content protection is provided. In particular, waveforms include each phase of current provided to ATRU 16, labeled 'iatru_a', 'iatru_b' and 'iatru_c', each phase of current provided to adjacent component ATU 18, labeled 'iatu_a', 'iatu_b' and 'iatu_c', generator contactor signal 'gcb' (representing the signal generated to open up the contactor connecting the generator to the distribution system), and output voltage of the AC generator 'vrms' (i.e., root mean square of the AC output voltage va, vb and vc).

In this simulation, a diode fault associated with ATRU 16 occurs at time 2.425 seconds (labeled 'diode fault'), which results in the generation of DC content on the ATRU currents iatru_a, iatru_b and iatru_c. In this simulation of a prior art system, circuit breaker 14a does not respond to the DC content and therefore does not trip open to isolate ATRU 16 from the remainder of the system.

DC content caused by the diode fault on ATRU 16 is propagated through the AC distribution system to ATU 18, resulting in DC content on the ATU currents iatu_a, iatu_b and iatu_c. The DC current is fed into ATU 18 until AC generator 12 trips 'open', thereby removing all power from the distribution system. Prolonged exposure of ATRU 16 and ATU 18 to DC content may result in the eventual failure of one or both units.

In this embodiment, AC generator is a variable-frequency AC generator operated in a current-control mode, in which the output current provided by the AC generator is controlled as desired by regulating the output voltage at the point-of-regulation (in this embodiment, essentially the output voltages at va, vb and vc). The presence of DC content on the output of the generator results in the generator 'folding back' the AC output voltage (represented in the simulation as a single rms value Vrms) in an effort to reduce the magnitude of the AC output current of the generator. As a result of the DC fault, the AC output voltage Vrms is reduced to nearly zero. The presence of persistent DC content at the output of AC generator 12, which is propagated onto the stator coils of AC generator 12, results in the saturation of the AC generator and eventual shutdown (via a main contactor of the generator, not shown here) of AC generator 12.

This simulation highlights the potential for DC content to be propagated between adjacent loads connected on the AC-DC distribution system, as well as the potential for the DC content to be propagated onto the AC generator supplying power to the AC distributions system. In this simulation, DC content propagated by a fault in ATRU 16 results in the eventual shutdown of AC generator 12, and the resulting loss of all loads connected to the AC generator.

Figure 4:
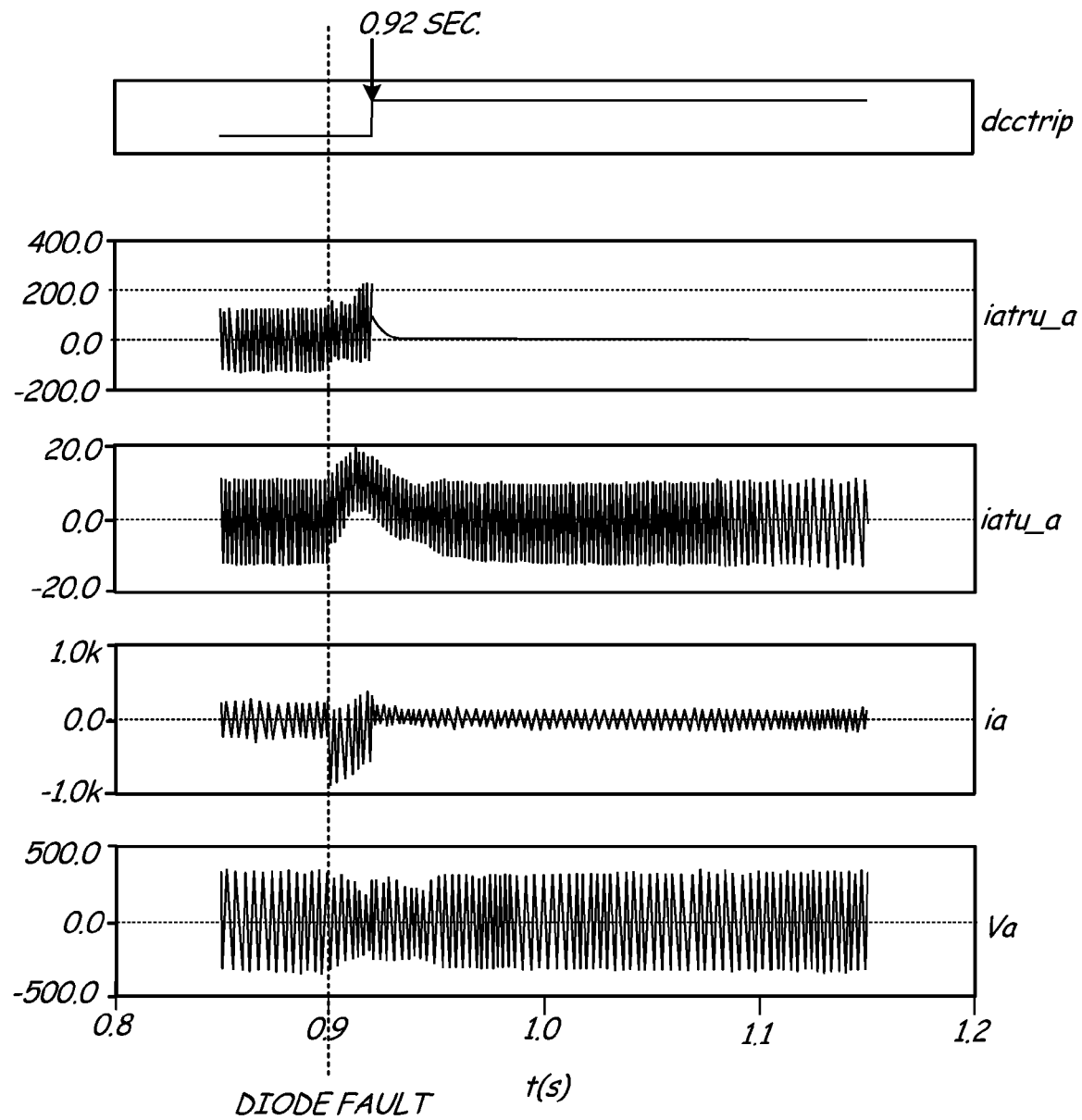
FIG. 4 shows a plurality of waveforms related to the operation of the AC/DC power distribution system according to an embodiment of the present invention.

FIG. 4 shows a plurality of waveforms related to the operation of AC/DC power distribution system according to an embodiment of the present invention. The waveforms were generated as part of a simulation based on the embodiment of the present invention described with respect to FIG. 1, in which each circuit breaker 14a and 14b provides DC content protection. The waveforms are once again labeled in accordance with the signal labels provided in FIG. 1, which includes the ATRU phase current iatru_a, the ATU 18 phase current iatu_a, the AC generator phase current ia, the AC generator phase voltage Va (not rms voltage in this simulation), and the trip signal DCCTRIP generated by circuit breaker 14a in response to detected DC content.

In this simulation, a diode fault occurs in ATRU 16 at 0.90 seconds (labeled 'diode fault'). Prior to the diode fault, the ATRU phase current iatru_a includes no significant DC content, as equal portions of the AC waveform are distributed around the zero Ampere (A) mark. In response to the diode fault, DC content in the ATRU phase current iatru_a increases as shown by the large increase in the positive magnitude of the current. Unlike the simulation described with respect to FIG. 3, circuit breaker 14a detects the presence of DC content, and after a selected time period (e.g., two milliseconds after the detected fault) initiates the trip signal DCCTRIP to open circuit breaker 14a at 0.92 seconds. ATRU 16 is electrically isolated from the AC distribution system, and as a result the ATRU phase current iatru_a falls to zero.

Following the diode fault, DC content on ATRU 16 is propagated, briefly, to ATU 18 as shown by the increase in DC content on ATU phase current iatu_a. In contrast with the simulation in FIG. 2, circuit breaker 14a isolates the fault load from the AC distribution system in response to the detected DC content. As a result, the DC content on ATU phase current iatu_a decreases following the tripping of circuit breaker 14a and operates in the normal fashion thereafter. In this way, the present invention illustrates the benefit of providing DC content protection with respect to each load, rather than at the AC generator. This allows faulty loads to be individually isolated from the distributed system, thereby allowing adjacent loads to continue operation without excessive DC content.

In addition, this simulation illustrates the benefit of isolating a fault load from AC generator 12, thereby preventing the saturation that resulted in the eventual shutdown of the generator in the simulation described with respect to FIG. 3. In this embodiment, AC generator 12 is once again a variable frequency AC generator operated in a current-controlled mode. Following the diode fault, DC content from ATRU 16 is propagated to the point-of-regulation (POR) associated with AC generator 12. As a result of the increase in DC content, the generator decreases the output voltage Vpor in order to ensure a corresponding decrease in the magnitude of the DC current in the generator. This is illustrated in the simulation shown in FIG. 3 by the decrease in the voltage Vpor and the corresponding decrease in the magnitude of the AC generator current ia. In particular, following circuit breaker 14a tripping open, DC content in the AC generator current ia falls to zero and the output voltage vpor recovers to a desired magnitude without AC generator 12 shutting down.

Figure 5:
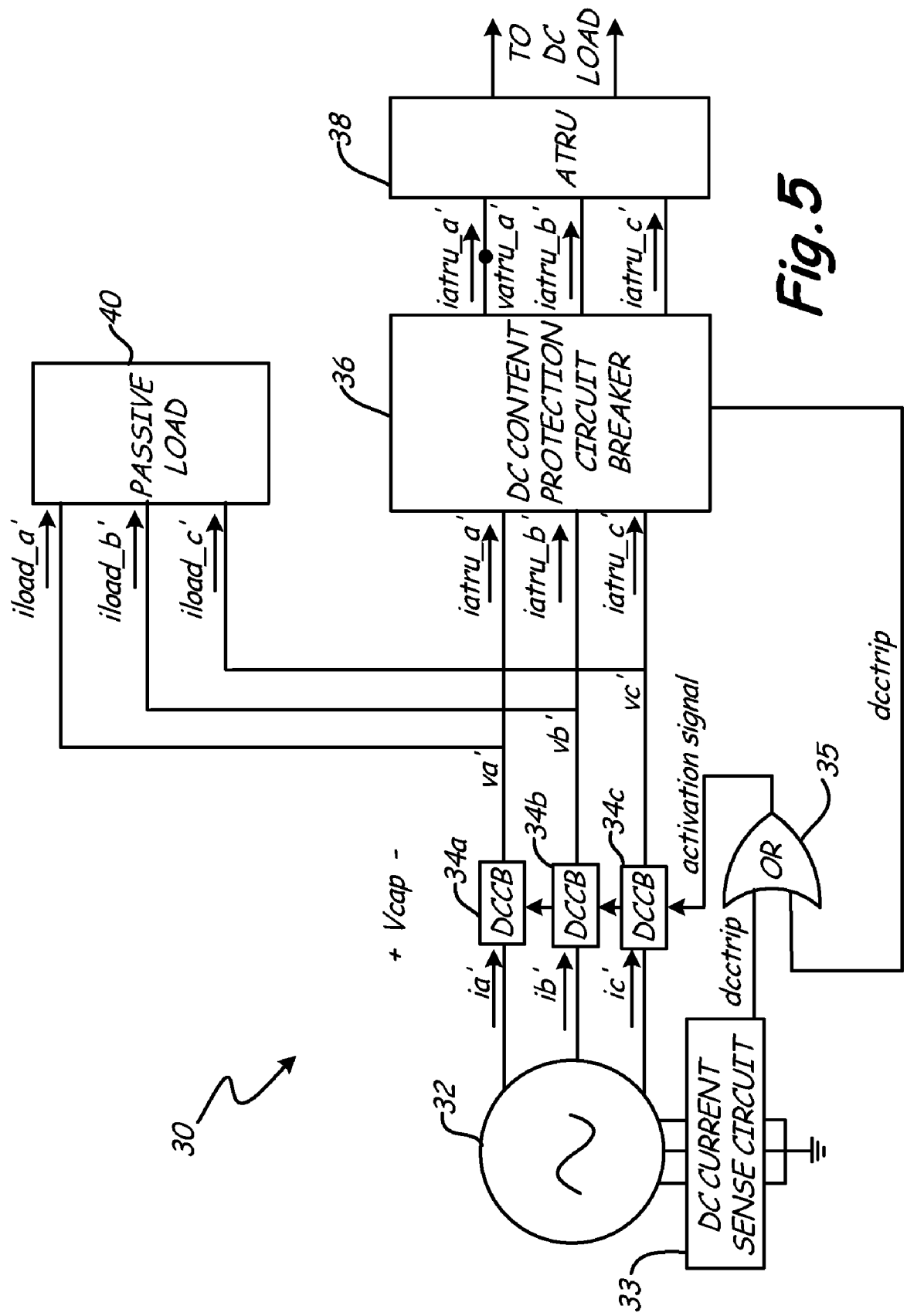
FIG. 5 is a block diagram of a variable frequency AC/DC power distribution system employing DC content protection circuit breakers and DC current blocking modules according to an embodiment of the present invention.

FIG. 5 is a block diagram of a variable frequency AC/DC power distribution system employing DC content protection circuit breakers and DC current blocking modules according to an embodiment of the present invention. In this embodiment, power distribution system 30 includes AC generator 32, DC current sensing circuit 33, DC current blocking modules 34a, 34b and 34c, DC content protection circuit breaker 36, autotransformer/rectifier unit (ATRU) 38 and passive load 40.

In this embodiment, circuit breaker 36 operates in the same manner as circuit breakers 14a and 14b described with respect to FIG. 1, wherein circuit breaker 36 is capable of detecting DC content, whether by the summation of each incoming phase current or based on the average current magnitude measured with respect to each incoming phase current. As a result, circuit breaker 36 isolates faulty loads from the remainder of the distribution system. In this embodiment, in addition to tripping open circuit breaker 36 in response to detected DC content, DC current blocking (DCCB) modules 34a, 34b and 34c are employed at the input of AC generator 32 to minimize the propagation of DC currents into the generator. By blocking DC current from AC generator 32, the generator is able to recover more quickly from a faulty load.

DCCB modules 34a, 34b and 34c are selectively controlled to operate in an active state or inactive state. In the inactive state, DCCB modules 34a, 34b and 34c operate essentially as short circuits, in which they have no effect on the output voltages va', vb', and vc' of AC generator 32 or DC content propagated by faulty loads. In the active state, DCCB modules 34a, 34b and 34c act to block DC current, without modifying the AC output supplied by AC generator 32.

The state of each of DCCB modules 34a, 34b and 34c is based on the detected presence of DC content. In the embodiment shown in FIG. 5, DC current sensing circuit 33 monitors AC currents provided by AC generator 32 at the neutral point potential of AC generator 32 (as opposed to the higher potential provided at the output of AC generator 32). In one embodiment, DC current sensing circuit 33 detects DC current using Hall-effect sensors in the manner described with respect to FIG. 2. In other embodiments, other types of sensors and sensor configurations may be employed to detect DC content on the AC current provided by AC generator 32.

In response to detected DC content, current sensing circuit 33 generates the signal labeled 'dcctrip' to one of the inputs of OR gate 35. At the other input of OR gate 35 is the dcctrip signal generated by DC content protection circuit breaker 36. In this way, DC content detected locally by DC current sensing circuit 33 or by one of the plurality of DC content protection circuit breakers (e.g., circuit breaker 36) results in DCCB modules 34a, 34b and 34c being placed in the active state such that DC content is prevented from being fed onto the input of AC generator 32. A fault (e.g., a DC content detection fault) either locally at AC generator or at one of the plurality of DC content protection circuit breakers is therefore not fatal to proper activation of DCCB modules 34a, 34b and 34c.

In another embodiment, either the dcctrip signal provided by DC current sensing circuit 33 is used to activate DCCB modules 34a, 34b and 34c or the dcctrip signal provided by DC content protection circuit breaker 36 is employed individually to activate DCCB modules 34a, 34b, and 34c. The dcctrip signal provided by DC current sensing circuit 33 can be supplied to DCCB modules 34a, 34b, and 34c more quickly than the dcctrip signal provided by DC content protection circuit breaker 36, which has to communicate the dcctrip signal via a communication channel from the location of the circuit breaker. A benefit of employing local DC content detection at AC generator 32 is the ability to quickly activate DCCB modules 34a, 34b, and 34c to block DC content from being fed onto the stator coils of AC generator 32.

Figure 6:
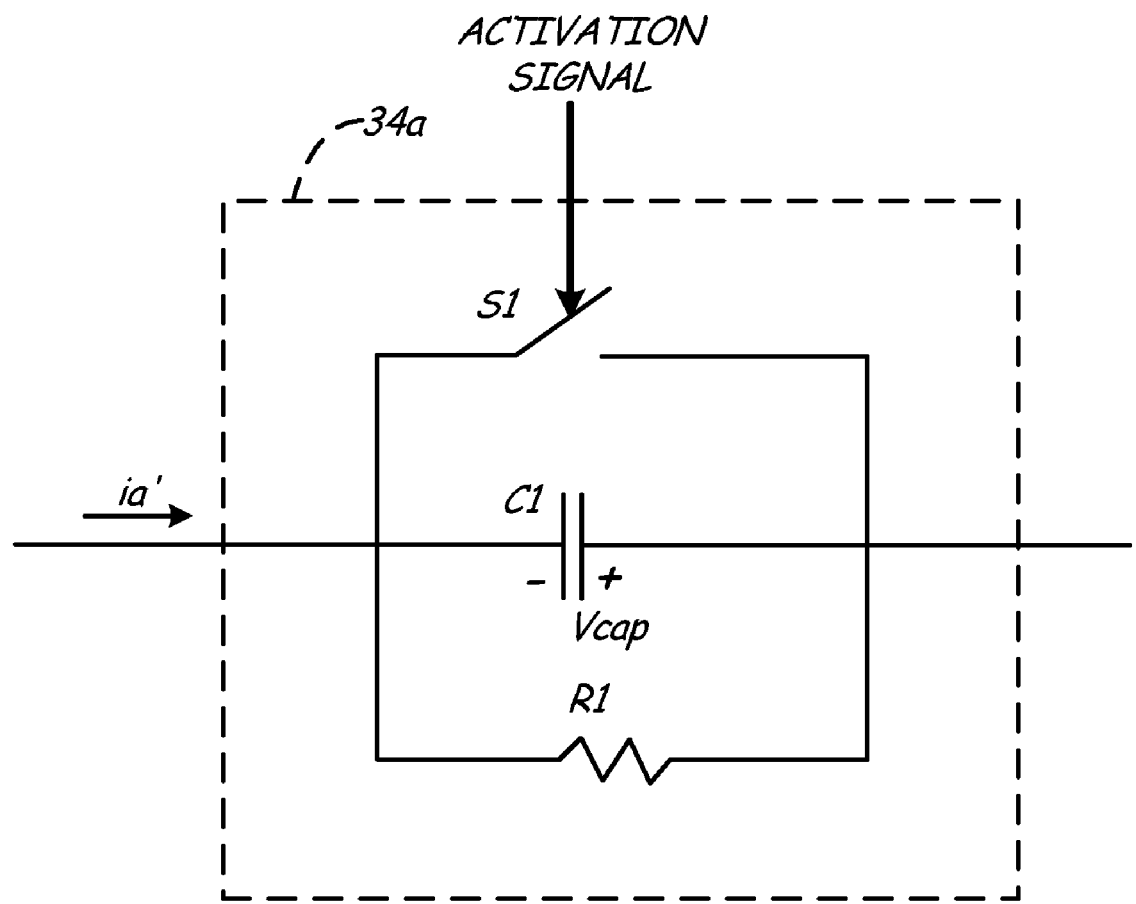
FIG. 6 is a circuit diagram illustrating in more detail a DC current blocking module according to an embodiment of the present invention.

FIG. 6 is a circuit diagram illustrating in more detail DC current blocking module 34a according to an embodiment of the present invention. In this embodiment, DCCB 34a includes resistor R1, capacitor C1 and normally closed switch/contactor S1. In the inactive state, switch S1 is closed to create a short circuit across DCCB 34a, effectively removing capacitor C1 and resistor R1 from the circuit path. In response to DC content detected on one of the plurality of circuit breakers (e.g., circuit breaker 36 shown in FIG. 5) or locally by DC current sensing associated with AC generator 32, an activate signal causes switch S1 to open, such that signals provided to DCCB module 34a (including both AC and DC signals) are provided across capacitor C1 and resistor R1, although resistor R1 is of sufficiently high resistance to prevent DC content from propagating through to AC generator 32. DC content generated as a result of a fault on one of the connected loads is blocked by the presence of capacitor C1, thereby preventing the propagation of DC content onto AC generator 32.

Figure 7:
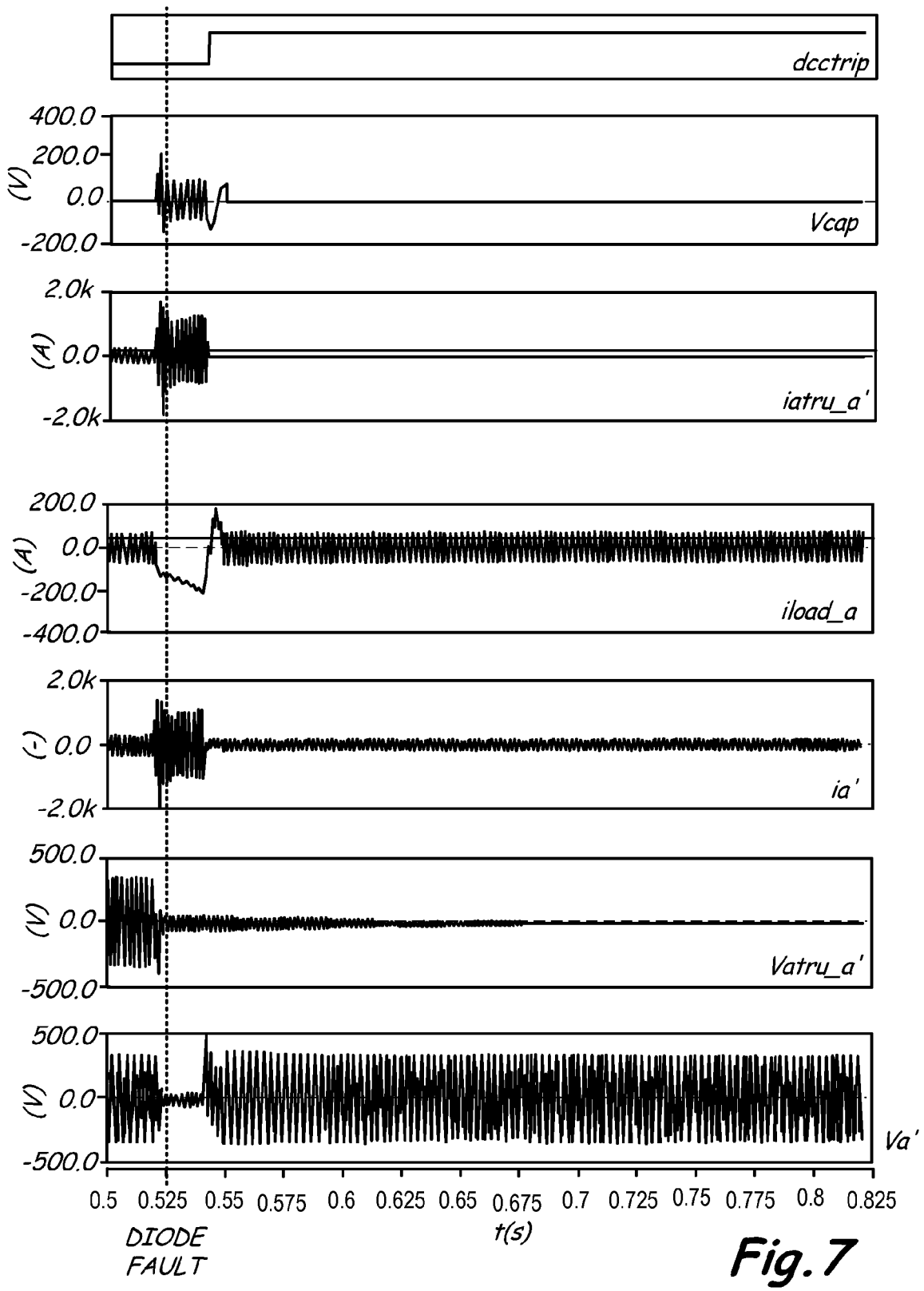
FIG. 7 shows a plurality of waveforms related to the operation of the AC/DC power distribution system in preventing the propagation of DC content to adjacent loads and in blocking DC content from being fed into the variable frequency generator.

FIG. 7 shows a plurality of waveforms related to the operation of the AC/DC power distribution system in preventing the propagation of DC content to adjacent loads and in blocking DC content being fed into the variable frequency generator. The waveforms were generated as part of a simulation experiment based on the embodiment of the present invention described with respect to FIG. 5, in which circuit breaker 36 includes DC content protection and DCCB modules 34a, 34b and 34c are selectively activated to block DC current in response to detected DC content by circuit breaker 34 or locally by DC current sensing circuit 33. The waveforms are once again labeled in accordance with the signal labels provided in FIG. 5, which includes the ATRU phase current iatru_a', the load phase current iload_a', the AC generator phase current ia', the ATRU phase voltage vatru_a', the AC generator point-of-regulation voltage vpor' and the capacitor voltage Vcap across capacitor C1.

In this simulation, a diode fault occurs at 0.52 seconds. In much the same way as discussed with respect to the simulation described with respect to FIG. 4, circuit breaker 36 initiates the trip signal DCTRIP (e.g., after a 0.02 second delay) to disconnect the faulty load from the AC distributions system, thereby preventing DC content from being propagated onto adjacent loads.

In addition, DCCB 34a is activated (in this case, at the time of the fault at 0.52 seconds) in response to detected DC content (either locally by DC current sensing circuit 33 associated with AC generator 12 or by DC content protection circuit breaker 34) to block DC content from being propagated into AC generator 32. In contrast with the simulation shown in FIG. 4, the AC generator phase current ia' contains no significant DC content. As a result, AC generator 32 does not become saturated and is able to recover more quickly following circuit breaker 36 tripping open. That is, the POR (point of regulation) voltage va' recovers more quickly as compared with embodiments (see the simulation in FIG. 4) in which DC currents are allowed, even briefly, to flow into the AC generator.

In this way, the present invention provides circuit breakers capable of detecting DC content, a departure from prior art systems in which highly isolated loads obviated the need for DC content detection. Based on detected DC content at a particular load, the present invention acts to isolate the fault load from the rest of the system. In this way, DC content can be individually isolated without an entire distribution system being shutdown. In addition, the present invention provides DCCB modules which are activated in response to a detected DC fault (detected either locally by DC current sense circuits associated with the AC generator or communicated by the circuit breaker that detected the presence of DC content) to prevent DC content from saturating the AC generator.

Although the present invention has been described with reference to preferred embodiments, workers skilled in the art will recognize that changes may be made in form and detail without departing from the spirit and scope of the invention.

The invention claimed is:

1. An AC-DC power distribution system comprising:
an alternating current (AC) generator for generating multi-phase AC power that is provided to an AC distribution system;
at least one electrical load that converts AC power provided on the AC distribution system to direct-current (DC) power;
at least one DC content protection circuit breaker connected to monitor the AC current provided to the electrical load to detect the presence of DC content;
wherein in response to DC content detected by the at least one circuit breaker, the circuit breaker trips open to disconnect the electrical load from the AC distribution system to prevent DC content from being propagated to the AC generator and/or adjacent loads connected on the AC distribution system; and
a DC current blocking (DCCB) module having an input electrically connectable to the AC generator and an output electrically connectable to the AC distribution system, the DCCB module having an inactive state in which the DCCB module represents a short-circuit and an active state in which the DCCB module blocks DC content from propagating into the AC generator, wherein in response to an activate signal the DCCB module is placed in the active state to prevent DC content from being propagated to the AC generator.

2. The system of claim 1, wherein the at least one circuit breaker generates the activate signal in response to the detected DC content and communicates the activate signal to the DCCB module.

3. The system of claim 1, further including:
a DC current sensor circuit connected to monitor AC currents generated by the AC generator to detect the presence of DC content, wherein the DC current sensor circuit generates an activate signal in response to detected DC content and communicates the activate signal to the DCCB module.

4. The system of claim 1, wherein the DCCB module further includes:
  a switch connected between the input and the output of the DCCB;
  a capacitor connected between the input and the output of the DCCB, and in parallel with the switch; and
  a resistor connected between the input and the output of the DCCB and in parallel with the capacitor and the switch, wherein the switch is closed during the inactive state and open during the active state.

5. The system of claim 1, wherein the at least one electrical load includes an autotransformer/rectifier unit (ATRU).

6. An AC-DC power distribution system comprising:
  an alternating current (AC) generator for generating multi-phase AC power that is provided to an AC distribution system;
  at least one electrical load that converts AC power provided on the AC distribution system to direct-current (DC) power;
  at least one DC content protection circuit breaker connected to monitor the AC current provided to the electrical load to detect the presence of DC content;
  wherein in response to DC content detected by the at least one circuit breaker, the circuit breaker trips open to disconnect the electrical load from the AC distribution system to prevent DC content from being propagated to the AC generator and/or adjacent loads connected on the AC distribution system; and
  wherein the DC content protection circuit breaker includes a DC current sensor circuit that monitors a phase of the AC current provided to the converter over a plurality of cycles and generates an average value associated with the phase of AC current, wherein the average value is compared to a threshold value to detect the presence of DC content.

7. A method of providing DC content protection to an AC-DC distribution system in which AC power generated by an AC generator is distributed to a plurality of AC-DC loads that convert the AC power to DC power for consumption by an attached load, the method comprising:
  measuring alternating current (AC) currents provided by the distribution system to one of the plurality of AC-DC loads;
  detecting DC content within the measured AC current indicative of a faulty AC-DC load, wherein detecting DC content within the measured AC current indicative of a faulty AC-DC load includes either summing each measured AC phase current to generate a summed current output wherein a non-zero summed current output is indicative of the presence of DC content, or averaging a measured AC phase current to generate an average current output wherein a non-zero average current output is indicative of the presence of DC content; and
  isolating the faulty AC-DC load by tripping open a circuit breaker connected between the AC distribution system and the AC-DC load to prevent DC content from propagating to adjacent loads.

8. The method of claim 7, further including
  activating a DC current blocking (DCCB) module connected at an output of the AC generator to prevent DC current being fed into the AC generator.

9. A method of providing DC content protection to an AC-DC distribution system in which AC power generated by an AC generator is distributed to a plurality of AC-DC loads that convert the AC power to DC power for consumption by an attached load, the method comprising:
  measuring alternating current (AC) currents provided by the distribution system to one of the plurality of AC-DC loads;
  detecting DC content within the measured AC current indicative of a faulty AC-DC load;
  isolating the faulty AC-DC load by tripping open a circuit breaker connected between the AC distribution system and the AC-DC load to prevent DC content from propagating to adjacent loads;
  measuring AC currents provided at a neutral point potential of the AC generator;
  detecting DC content in the measured AC currents; and
  activating a DC current blocking (DCCB) module in response to detected DC content at the neutral point potential of the AC generator.

10. A protection system for isolating individual loads from an AC-DC distribution system sourced by an AC generator to prevent the propagation of DC content to the distribution system and onto the AC generator, the system comprising:
  at least one electrical load that converts AC power provided on the AC distribution system to direct-current (DC) power;
  at least one DC content protection circuit breaker having a DC current sense circuit connected to monitor the AC current provided to the electrical load to detect the presence of DC content;
  a local DC current sense circuit connected to monitor the AC currents around the neutral of the AC generator to detect the presence of DC content;
  a DC current blocking (DCCB) module having an input electrically connectable to the AC generator and an output electrically connectable to the AC distribution system, the DCCB module having an inactive state in which the DCCB module represents a short-circuit and an active state in which the DCCB module blocks DC content from propagating into the AC generator,
  wherein in response to DC content detected by the local DC current sense circuit, an activate signal is communicated to the DCCB module to place the module in the active state; and
  wherein in response to DC content detected by the DC current sense circuit associated with the circuit breaker, the circuit breaker trips open to disconnect the electrical load from the AC distribution system to prevent DC content from being propagated to adjacent loads connected on the AC distribution system.

11. The protection system of claim 10, wherein the DCCB modules are connected to receive activate signals from either the DC current sense circuit associated with the at least one circuit breaker or from the local DC current sense circuit, wherein activate signals received from either input results in the DCCB module being placed in the active state.

12. The protection system of claim 10, wherein the DCCB module includes:
  a switch connected between the input and the output of the DCCB module;
  a capacitor connected between the input and the output of the DCCB module, and in parallel with the switch; and
  a resistor connected between the input and the output of the DCCB and in parallel with the capacitor and the switch, wherein the switch is opened in response to a fault detected by the fault detecting means to block DC content from propagating into the AC generator.

13. An AC-DC power distribution system comprising:
  an alternating current (AC) generator for generating multi-phase AC power that is provided to an AC distribution system;

at least one electrical load that converts AC power provided on the AC distribution system to direct-current (DC) power;

at least one DC content protection circuit breaker connected to monitor the AC current provided to the electrical load to detect the presence of DC content; and wherein the DC content protection circuit breaker includes a current sensor circuit that includes a plurality of current sensors for monitoring the AC currents provided in the electrical load and a summer/comparator circuit that sums the AC currents monitored by the current sensors to generate a summed value and compares the summed value to a threshold value to detect the presence of DC content on the monitored AC current, wherein if the summed value exceeds the threshold value a trip signal is generated to trip the DC content protection circuit breaker to disconnect the electrical load from the AC distribution system to prevent DC content from being propagated to the AC generator and/or adjacent loads connected to the AC distribution system.

14. The AC-DC power distribution system of claim 13, wherein the plurality of current sensors provide analog values, and wherein the summer/comparator circuit includes analog circuitry that amplifies and sums the analog values provided by the plurality of current sensors to generate an amplified/summed value for comparison to the threshold value.

15. The AC-DC power distribution system of claim 14, wherein the DC content protection circuit breaker includes a DC current sensor circuit that employs a plurality of Hall-effect sensors for monitoring the AC current provided to the electrical load.

16. The AC-DC power distribution system of claim 13, wherein the plurality of current sensors provide digital values, and wherein the summer/comparator circuit includes digital circuitry that receives digital values provided by the plurality of current sensors and implements functions to sum the digital values to generate a summed value for comparison to the threshold value.

* * * * *